Patented Jan. 9, 1934

1,943,231

UNITED STATES PATENT OFFICE 1,943,231

NITRO-MIXED FATTY ACID ESTERS OF CELLULOSE AND METHOD FOR PRODUCING

David R. Wiggam, Kennett Square, Pa., and John S. Tinsley, Wilmington, Del., assignors to Hercules Powder Company, Wilmington, Del., a corporation of Delaware No Drawing. Application February 13, 1932
Serial No. 592,840

17 Claims. (Cl. 260—101)

This invention relates to an improvement in nitro-mixed fatty acid esters and method for their production. The method more particularly involves the direct or one step production of nitro-mixed fatty acid esters of such a character as to be soluble in a wide range of solvents without any further treatment.

Heretofore it has been known to produce cellulose nitro-acetate by a one step process involving acetylation of cellulose by means of acetic acid and acetic anhydride in the presence of a small amount of mineral acid which acts as a catalyst and a salt of nitric acid with a weak base; and to produce cellulose nitro-acetates by such treatment with the addition of urea. The prior methods indicated are, for example, shown in the United States Patents to Ludwig Lock No. 1,817,994 and to Wilhelm Walter No. 1,819,397, respectively. Further, it has heretofore been suggested to produce nitro-mixed acid esters of cellulose by a two step process involving the production of a relatively low nitrogen content cellulose nitrate and then reacting the cellulose nitrate with at least two organic acids, one of which is an acid anhydride. Such method for the production of nitro-mixed organic ester of cellulose is disclosed, for example, in the application for patent filed by Wiggam and Tinsley, March 20, 1931, Serial No. 526,550.

The nitro-acetates heretofore produced, as for example, by the methods disclosed in the two United States patents mentioned, are of little value as produced by the one step process as described, more particularly, in that they are relatively insoluble or are not soluble in a range of solvents such as to make them generally usable. Hence, it has been necessary to hydrolyze such nitro-acetates in order to give them a solubility rendering them desirable.

Now, in accordance with the method contemplated in connection with this invention, there are produced nitro-mixed fatty acid esters of cellulose embodying the invention which are, as produced by the method involving direct or one step production of the esters, soluble in a wide range of solvents, capable of forming from their solutions films, filaments, etc. which are valuable in connection with the production of photographic films, electrical insulation, transparent wrappings, wire screen covering, flexible window lights, threads, filaments, etc. and for various other uses and purposes. The esters may be readily formulated for the production of plastic masses and molded objects, and, as will be apparent to those skilled in the various arts, will lend themselves to various other uses.

The method in accordance with this invention involves broadly the esterification of cellulose with a mixture including a fatty acid anhydride and a fatty acid of different molecular weight than that represented in the anhydride, a mineral acid catalyst and a salt of nitric acid with a weak base. The esterification is effected by the application of heat.

The nitro-mixed fatty acid esters in accordance with this invention will be found to be characterized more particularly by the fact that they are as produced and without further treatment soluble in a wide range of solvents, as for example, methylene or ethylene dichloride, etc.

In the practical adaptation of the method in accordance with the above invention, any suitable form of cellulose may be used, as cotton, alpha-cellulose, etc. etc. As the fatty acid anhydride there may be used, for example, acetic, butyric, propionic, valeric acid anhydrides, etc. and as the fatty acid of different molecular weight than that represented in the anhydride there may be used, for example, propionic, butyric, valeric, etc. acids, the acid used in connection with any anhydride being selected by virtue of its having a different molecular weight than that represented in the anhydride used. As the catalyst there may be used, for example, sulphuric acid, etc. As the salt of nitric acid with a weak base there may be used, for example, ammonium nitrate, urea nitrate, guanidine nitrate, etc.

In carrying out the method the reaction may be effected in the presence of heat at any effective temperature. The reaction, for example, desirably will be carried out at a temperature of say 40–90° C.

As illustrative of the practical adaptation of the method in accordance with this invention for the production of cellulose nitro-aceto-butyrate, for example, 100 grams of cellulosic material is treated with a mixture of 300 grams acetic anhydride, 500 grams of n-butyric, 50 grams ammonium nitrate and 0.4 grams of sulphuric acid at 65–70° C. until the reaction is complete as shown by the solution of the ester in the reaction bath. The cellulose nitro-aceto butyrate may then be separated from its solution in the reaction bath in any desired manner, as for example, by precipitation or by the addition of water to the bath, or by the addition of, for example, a non-solvent.

As a further illustration of the method embodying this invention for the production, for example, of cellulose nitro-aceto-butyrate, for example, 100 grams of cellulose may be treated with a mixture of 350 grams of acetic anhydride, 450 grams isovaleric acid, 10 grams urea nitrate and 0.5 gram sulphuric acid, at a temperature of 70–80° C. with stirring until the cellulose is completely esterified and the reaction is complete, as shown by its dissolving into the reaction mixture. The ester product may be recovered by precipitation from the reaction mixture indicated.

The practical adaptation of the method may be varied widely. Thus, for example, as has been indicated, various acids and anhydrides may be used, it being only necessary to use an acid of different molecular weight than that represented in the anhydride. Thus, note that there may be substituted numerous branched and straight chained fatty acids for those named. In carrying out the method of the invention with the use of an acid having more than eight carbon atoms, it will usually be found necessary to employ some common solvent for the mixed ester and acids, for example, methylene or ethylene dichloride. The procedure in accordance with this invention may be otherwise variously modified in the amount and kind of catalyst used, in the salt of nitric acid and in the temperature used.

The nitro-mixed fatty acid esters embodying this invention will be found to vary slightly with a change in the acid used. The esters will be found, as has been indicated, to be soluble in a wide range of solvents, as ethylene dichloride, 1:4 dioxan, etc., etc. without the necessity for any treatment subsequent to their production, and, as has been indicated, filaments, films, etc. having wide and varied use in the commercial arts will be produced. By regulation of the components of the mixture used for the production of the esters, the nitrogen content of the esters may be varied. Thus, for example, esters may be produced having a nitrogen content of, for example, 0.1% to 2.0%.

What we claim and desire to protect by Letters Patent is:

1. The method of producing a nitro-mixed fatty acid ester which includes esterifying cellulose with a mixture of a fatty acid anhydride, a fatty acid of different molecular weight than the acid represented in the anhydride, a mineral acid catalyst and a salt of nitric acid with a weak base.

2. The method of producing a nitro-mixed fatty acid ester which includes esterifying cotton with a mixture of a fatty acid anhydride, a fatty acid of different molecular weight than the acid represented in the anhydride, a mineral acid catalyst and a salt of nitric acid with a weak base.

3. The method of producing a nitro-mixed fatty acid ester which includes treating cellulose with a mixture of a fatty acid anhydride, a fatty acid of different molecular weight than the acid represented in the anhydride, a mineral acid catalyst and a salt of nitric acid with a weak base in the presence of heat at a temperature to effect esterification of the cellulose.

4. The method of producing a nitro-mixed fatty acid ester which includes treating cellulose with a mixture of a fatty acid anhydride, a fatty acid of different molecular weight than the acid represented in the anhydride, a mineral acid catalyst and a salt of nitric acid with a weak base in the presence of heat at a temperature of 40–90° C.

5. The method of producing a nitro-mixed fatty acid ester which includes esterifying cellulose with a mixture of acetic anhydride, a fatty acid of different molecular weight than the acid represented in the anhydride, a mineral acid catalyst and a salt of nitric acid with a weak base.

6. The method of producing a nitric-mixed fatty acid ester which includes esterifying cellulose with a mixture of butyric anhydride, a fatty acid of different molecular weight than the acid represented in the anhydride, a mineral acid catalyst and a salt of nitric acid with a weak base.

7. The method of producing a nitro-mixed fatty acid ester which includes esterifying cellulose with a mixture of a fatty acid anhydride, a fatty acid of different molecular weight than the acid represented in the anhydride, sulphuric acid and a salt of nitric acid with a weak base.

8. The method of producing a nitro-mixed fatty acid ester which includes treating cellulose with a mixture of acetic anhydride, a fatty acid of different molecular weight than the acid represented in the anhydride, sulphuric acid and a salt of nitric acid with a weak base in the presence of heat at a temperature of 40–90° C.

9. The method of producing a nitro-mixed fatty acid ester which includes esterifying cellulose with a mixture of a fatty acid anhydride, a fatty acid of different molecular weight than the acid represented in the anhydride, a mineral acid catalyst and ammonium nitrate.

10. The method of producing a nitro-mixed fatty acid ester which includes esterifying cellulose with a mixture of a fatty acid anhydride, a fatty acid of different molecular weight than the acid represented in the anhydride, sulphuric acid and urea nitrate.

11. The method of producing a nitro-mixed fatty acid ester which includes esterifying cellulose with a mixture of acetic anhydride, a fatty acid of different molecular weight than the acid represented in the anhydride, sulphuric acid and a salt of nitric acid with a weak base.

12. The method of producing a nitro-mixed fatty acid ester which includes esterifying cellulose with a mixture of butyric anhydride, a fatty acid of different molecular weight than the acid represented in the anhydride, sulphuric acid and a salt of nitric acid with a weak base.

13. The method of producing a nitro-mixed fatty acid ester which includes treating cellulose with a mixture of acetic anhydride, a fatty acid of different molecular weight than the acid represented in the anhydride, a mineral acid catalyst and a salt of nitric acid with a weak base in the presence of heat at a temperature of 40–90° C.

14. The method of producing a nitro-mixed fatty acid ester which includes treating cellulose with a mixture of butyric anhydride, a fatty acid of different molecular weight than the acid represented in the anhydride, a mineral acid catalyst and a salt of nitric acid with a weak base in the presence of heat at a temperature of 40–90° C.

15. The method of producing a nitro-mixed fatty acid ester which includes esterifying cellulose with a mixture of acetic anhydride, butyric acid, a mineral acid catalyst and a salt of nitric acid with a weak base.

16. The method of producing a nitro-mixed fatty acid ester which includes treating cellulose with a mixture of acetic anhydride, butyric acid, a mineral acid catalyst and a salt of nitric acid with a weak base in the presence of heat at a temperature of 40–90° C.

17. The reaction product of cellulose with a fatty acid anhydride, a fatty acid of different molecular weight than the acid represented in the anhydride, a mineral acid catalyst and a salt of nitric acid with a weak base.

DAVID R. WIGGAM.
JOHN S. TINSLEY.